(12) United States Patent
Schorpp et al.

(10) Patent No.: US 7,778,503 B2
(45) Date of Patent: Aug. 17, 2010

(54) ELECTRONIC DEVICE HAVING OPTICAL DATA CONNECTION OF MOVABLE HOUSING PARTS

(75) Inventors: Marcus Schorpp, Lempaala (FI); Maatta Esa-Sakari, Farnborough (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/295,446

(22) PCT Filed: Mar. 31, 2006

(86) PCT No.: PCT/IB2006/000762

§ 371 (c)(1),
(2), (4) Date: Sep. 30, 2008

(87) PCT Pub. No.: WO2007/113604

PCT Pub. Date: Oct. 11, 2007

(65) Prior Publication Data

US 2009/0110352 A1     Apr. 30, 2009

(51) Int. Cl.
G02B 6/12    (2006.01)
G02B 6/26    (2006.01)

(52) U.S. Cl. ............................ 385/14; 385/18; 385/25

(58) Field of Classification Search ............... 385/14, 385/18, 25
See application file for complete search history.

(56) References Cited

U.S. PATENT DOCUMENTS

| | | | | |
|---|---|---|---|---|
| 3,787,702 | A | * | 1/1974 | Hujer et al. ............... 235/454 |
| 4,906,837 | A | * | 3/1990 | Doneen et al. .......... 250/227.29 |
| 5,199,090 | A | * | 3/1993 | Bell ........................... 385/33 |
| 5,539,562 | A | * | 7/1996 | Morioka et al. ............ 398/131 |
| 5,600,741 | A | * | 2/1997 | Hauer et al. ................. 385/35 |
| 5,844,685 | A | * | 12/1998 | Gontin ....................... 356/433 |

(Continued)

FOREIGN PATENT DOCUMENTS

JP    2005-064205    2/2006

(Continued)

OTHER PUBLICATIONS

PCT/US2006/000762 International Search Report, dated Nov. 29, 2006.

(Continued)

*Primary Examiner*—K. Cyrus Kianni
(74) *Attorney, Agent, or Firm*—Alston & Bird LLP

(57) ABSTRACT

The present invention provides an electronic device comprising two or more housing parts which are movable in relation to each other with an optical arrangement enabling optical data communication between electronic components located in the housing parts. The device according to the invention comprises a first housing part comprising first electronic components, a second housing part comprising second electronic components, wherein said first housing part and said second housing part are movably connected and capable of taking at least a first and a second position in relation to each other, a first optoelectronic device connected with said first electronic components, a second optoelectronic device connected with said second electronic components, and a first light duct, and a second light duct, wherein said first light duct is arranged to provide a first light path optically coupling said optoelectronic devices in said first position, and said second light duct is arranged to provide a second light path optically coupling said optoelectronic devices in said second position.

3 Claims, 6 Drawing Sheets

U.S. PATENT DOCUMENTS

| | | | |
|---|---|---|---|
| 5,889,602 A | 3/1999 | Johnson et al. | |
| 6,154,438 A * | 11/2000 | O'Hollaren et al. | 369/275.3 |
| 6,181,673 B1 * | 1/2001 | Wilde et al. | 369/300 |
| 6,399,952 B1 * | 6/2002 | Maher et al. | 250/458.1 |
| 6,456,766 B1 * | 9/2002 | Shaw et al. | 385/47 |
| 6,693,926 B2 * | 2/2004 | Cayrefourcq et al. | 372/14 |
| 6,724,718 B1 * | 4/2004 | Shinohara et al. | 369/300 |
| 6,934,429 B2 * | 8/2005 | Kikuchi et al. | 385/14 |
| 6,992,718 B1 * | 1/2006 | Takahara | 348/333.09 |
| 2001/0055462 A1 * | 12/2001 | Seibel | 385/147 |
| 2002/0172134 A1 * | 11/2002 | Wilde et al. | 369/112.27 |
| 2003/0019838 A1 * | 1/2003 | Shaw et al. | 216/20 |
| 2003/0087610 A1 | 5/2003 | Ono | |
| 2003/0117623 A1 * | 6/2003 | Tokhtuev et al. | 356/338 |
| 2003/0203492 A1 * | 10/2003 | Sillman | 436/46 |
| 2004/0165828 A1 * | 8/2004 | Capewell et al. | 385/47 |
| 2006/0263271 A1 * | 11/2006 | Sillman | 422/104 |

FOREIGN PATENT DOCUMENTS

| | | |
|---|---|---|
| WO | WO 02-21730 A2 | 3/2002 |
| WO | WO 2005-034390 A2 | 4/2005 |

OTHER PUBLICATIONS

PCT/US2006/000762 Written Opinion, dated Nov. 29, 2006.

* cited by examiner

ELECTRONIC DEVICE HAVING OPTICAL DATA CONNECTION OF MOVABLE HOUSING PARTS

The present invention relates to an electronic device comprising two or more housing parts which are movable in relation to each other, the device comprising an optical arrangement enabling optical data communication between electronic components located in the housing parts. It particularly relates to mobile electronic devices with two housing parts which can be folded or slid open/closed.

TECHNICAL FIELD

Mobile electronic devices comprising two movable housing sections or parts have become rather popular recently. Prominent examples are the so-called slider phones and the so-called flip- or collapsible phones. The housing parts of such phones usually can take at least two positions, wherein in a first (closed) position only the most important display and/or control elements are accessible, for example the display together with keys for taking/rejecting calls and viewing incoming messages. In order to render the phone fully operational, that is, to enable the user to access all control and/or display elements, the housing parts are moved in relation to each other, taking the second (open) position exposing e.g. the full keypad and/or main display.

Slider phones usually comprise two housing parts which are arranged substantially coplanar in the first position. The upper housing part can be shifted with relation to the bottom part. Flip-, collapsible or foldable phones usually also have a first closed position wherein the housing parts are located on top of each other. In these phones the upper housing part can be folded open to render the phone fully operational.

Such phones usually comprise a bottom part housing the keypad, bottom connector etc., and a top part housing the display, camera etc. Advantages of such phone structures include an enhanced available area for both display and keypad, that is, the display and control elements can be designed larger. In this manner larger scale displays and keypads/keys can be incorporated in such devices, enabling improved usability. Through the use of the movable housing parts these advantages are though combined with a small footprint of the (folded/closed) phone, maintaining a good portability of the device. However, a disadvantage of such phones is that the two parts require a data connection in order to exchange data, e.g. from a camera located in the top part to the processor located in the bottom part, or the processor in the bottom part to the display in the top part.

In conventional slider or flip phones usually flexible cables are used to interconnect the top and bottom part. The cables require careful design to fulfil mechanical durability and electrical reliability requirements, especially when used in high data rate applications. High-speed interconnections are needed because display and camera resolutions are constantly increasing, e.g. for mobile TV applications as DVB-H and mega pixel cameras. This requirement is even more aggravated by the trend of serialization of the data connections, which are still mainly parallel interconnections used frequently nowadays. The serialization trend is inter alia caused by the increasing miniaturization. Currently conventional flexible cables and micro coax cables are used, which require much space on the printed wiring board (PWB) and increase the product volume. Their design is rather difficult for high data rates, particularly in the gigabit per second area. Also they are subject to mechanical wear which may finally result in breakage of the data connection, rendering the respective electronic device inoperative.

Therefore it is an object of the present invention to provide an electronic device with movable housing parts, wherein the conventional interference-prone wired connections between the housing parts are replaced by connections which are more reliably from mechanical point of view and which enable higher data rate applications. Furthermore it is an object of the invention to provide such a device wherein only one optical sender/receiver is required per housing part.

SUMMARY OF THE INVENTION

According to an aspect of the present invention an electronic device is provided, comprising:
  a first housing part comprising first electronic components;
  a second housing part comprising second electronic components;
wherein said first housing part and said second housing part are movably connected and capable of taking at least a first and a second position in relation to each other;
  a first optoelectronic device connected with said first electronic components;
  a second optoelectronic device connected with said second electronic components;
and
  a first light duct; and
  a second light duct;
wherein
  said first light duct is arranged to provide a first light path optically coupling said optoelectronic devices in said first position; and
  said second light duct is arranged to provide a second light path optically coupling said optoelectronic devices in said second position.

Replacing the mechanically stressed conventional wire connections with optical data links provides an improved reliability in such electronic devices, while at the same time enabling higher data rates. Furthermore the arrangement of the present invention does not need more than one optoelectronic sender/receiver or transceiver per housing part, thus saving costs and area on the printed wiring board. Still further advantages of such an arrangement will be explained in more detail in the detailed description of embodiments of the present invention.

The first electronic components may comprise the main controller or CPU of the device, memory means, control elements as a keypad, navigation 4-way key and other electronic components used in electronic devices. The second electronic components may comprise the main display of the device, a still or video camera, video microphone, a WLAN or Bluetooth module and auxiliary control elements like call taking/rejecting keys, a key for scrolling through received messages and the like. That is, there are electronic components located in each housing part which require a data connection with electronic components located in the other housing part. The data connection can both be uni-directional as well as bi-directional, depending on the actual combination of electronic components.

According to an exemplary embodiment the first and second housing parts are connected slidably, and the device further comprises:
  a first light guiding element connected with said first optoelectronic device;

a second light guiding element connected with said second optoelectronic device; and a light deflection element arranged on said second housing part;

wherein said first light duct is formed by said first light guiding element; and said second light duct is formed by said first light guiding element, said light deflection element and said second light guiding element.

According to an exemplary embodiment the first and second housing parts are connected foldably via a hinge element, and the device further comprises:

a first light guiding element connected with said first optoelectronic device;

a second light guiding element connected with said second optoelectronic device; and a light deflection element arranged on the hinge element;

wherein said first light duct is formed by said first light guiding element, said light deflection element and said second light guiding element; and said second light duct is formed by said first light guiding element and said second light guiding element.

According to an exemplary embodiment the first and second housing parts are connected foldably, and the device further comprises:

a first deflection element connected with said first optoelectronic device;

a second deflection element connected with said second optoelectronic device;

a first light guiding element connected with said first optoelectronic device; and a second light guiding element connected with said second optoelectronic device;

wherein said first light duct is formed by said first and said second deflection element; and said second light duct is formed by said first light guiding element and said second light guiding element.

According to an exemplary embodiment the first and second deflection elements each comprise a diffraction grating or at least one reflecting element.

According to an exemplary embodiment the first and second housing parts are connected slidably, and the device further comprises:

a light guiding element, wherein a first end thereof is connected with said first optoelectronic device;

a beam splitter located within said light guiding element, adapted for deflecting a fraction of light emitted by said first optoelectronic device; and a second deflection element located at a second end of said light guiding element, adapted for deflecting the remaining fraction of light;

wherein said first light duct is formed by the section of said light guiding element extending from said optoelectronic device to said beam splitter, and said beam splitter; and said second light duct is formed by said light guiding element and said second light deflection element.

According to an exemplary embodiment the first and the second deflection element each comprise at least one reflecting element.

According to an exemplary embodiment the first optoelectronic device is an optical emitter and said second optoelectronic device is an optical receiver. In case only a uni-directional data link from the electronic components in the bottom housing part to the electronic components in the top part is necessary, this embodiment is sufficient while at the same time being cost-efficient.

According to an exemplary embodiment the first and the optoelectronic devices are optical transceivers. This embodiment enables a bi-directional data connection between the electronic components located in the respective housing parts. Examples where such a connection is required or at least useful will be explained in the detailed description.

BRIEF DESCRIPTION OF THE DRAWINGS

The invention can be more fully understood by referring to the attached drawings, which are provided only for illustrating exemplary embodiments of the present invention, but which should not be construed as limiting the invention to particular details. In the drawings

DETAILED DESCRIPTION OF THE INVENTION

Figure 1:
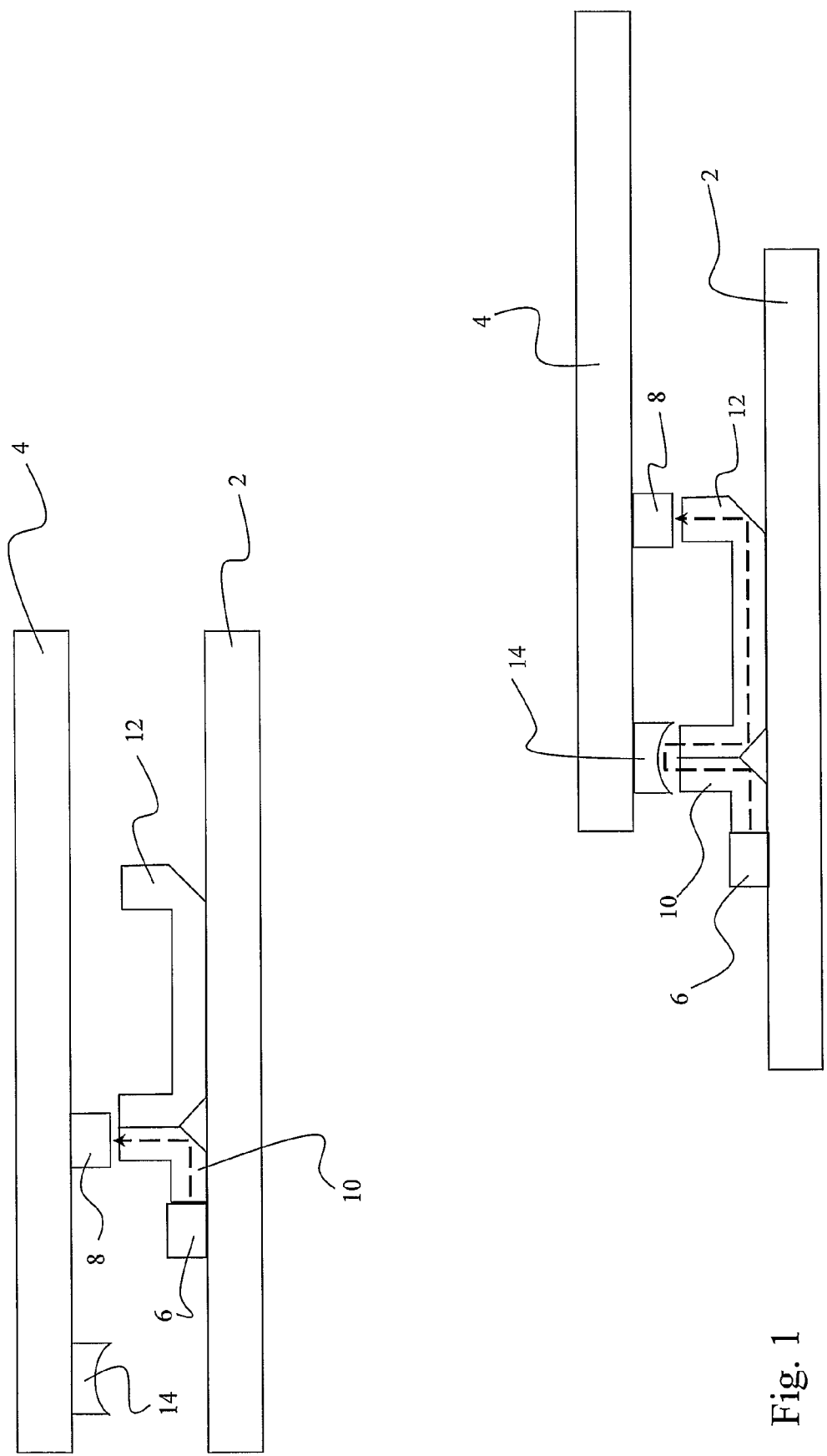
FIG. 1 is a schematic view of an embodiment of the electronic device of the present invention to be used with a slide phone.

In FIG. 1 a first embodiment of the present invention is depicted schematically. That is, common elements present in a mobile phone or like devices are not shown here, like displays, control keys etc. Also the dimensions depicted here are only to be understood as illustrative, and should not be construed as limiting for the present invention. In this and also the other figures certain dimensions (e.g. the distance between top and bottom housing part) may intentionally be exaggerated, in order to improve the intelligibility. These remarks apply similarly to the other figures, in order to avoid unnecessary repetitions.

This embodiment relates to a so-called slider phone, comprising a first or bottom housing part 2 and a second or top housing part 4. In the upper left of this figure the phone is shown in its first or closed position, wherein the housing parts 2 and 4 are located on top of each other. In the lower right of this figure the corresponding open position of the slider phone is depicted.

On the bottom part 2 an optoelectronic sender 6 is arranged, which is electrically connected with (not shown) first electronic components accommodated within the bottom part 2. The connection may be implemented through suitable interfaces (also not shown). Such electronic components may comprise the bottom connector of the phone, memory devices, the controller or CPU, a keypad and other control keys/means etc. That is, the (electronic interface of) sender 6 is connected with electronic components which require a data connection with other electronic components located in the top housing part 4.

On the second or top housing part 4 an optoelectronic receiver 8 is located. The top housing part 4 further comprises a light deflection element 14. A first light guiding element 10 is connected with the optical interface of sender 6, and a second light guiding element 12 is also located on the bottom part 2.

First the closed position depicted in the upper left part of this figure shall be explained. In this first position the housing parts 2 and 4 are located such that the first light guiding element 10 form a first light duct providing a first light path (indicated by the dashed arrow), which leads light emitted from the sender 6 to the receiver 8. That is, this light path provides a data connection from sender 6 to receiver 8. Due to the nature of optical light guides it is also possible to transport light in the opposite direction, that is, from receiver 8 to sender 6. In advanced embodiments the sender 6 and receiver 8 may be replaced by optoelectronic transceivers enabled to both send and receiver light. In this case also a (bi-directional) data connection between the transceivers 6 and 8 is enabled by the present invention.

In the open or second position of the two housing parts 2 and 4 the receiver 8 is located such that the light emitted from sender 6 and transmitted by the first light guiding element 10 can not directly reach it. Therefore the light deflection element 14 is provided on the top housing part 4. This light deflection element 14 will deflect light transmitted from the first light guiding element 10 such that it enters the second light guiding element 12. The second light guiding element 12 in turn transmits the light further to the receiver 8. In other words, in the second position of the housing parts a second light duct is formed by the first light guiding element 10, the light deflection element 14 and the second light guiding element 12, providing a second light path (indicated by the long dashed arrow) which again leads light emitted from the sender 6 to the receiver 8.

An example of an embodiment having only a uni-directional connection from sender 6 to receiver 8 may be a phone having the keypad, memory, CPU etc. in the bottom housing part 2, and just the display in the top housing part 4. In that case the uni-directional link is sufficient, as usually no signals need to be sent from the display unit back to the CPU or like. It should be noted that a required power connection for providing the electric energy will usually be of a conventional, that is, wired type. In the context of the present invention it is also possible to use conventional wired connections for a portion of signals to be transported between different housing parts, in addition to the optical connection which is the main feature of the present invention. For example certain control data might be transported by conventional wires/cables, while the main (payload) data will be transported by the optical connection.

Furthermore it is common that the microphone (for voice calls etc.) is built into the bottom part 2 of the housing, while the corresponding speaker is built into the top housing part 4. Also in this case it is not required to have a bi-directional link, as the microphone is already in the housing part where conventionally the main controller/CPU is located, such that a direct wired connection can easily be provided. The speaker in turn is only required to receive audio data and conventionally does not send back any data, such that the uni-directional data connection provided by the embodiment with the combination of sender 6/receiver 8 only is sufficient.

In contrast, as an example of a slider phone requiring a bi-directional link a phone having control keys and e.g. a camera/microphone incorporated in the top housing part 4 shall be mentioned. This also entails that sender 6 and receiver 8 are both actually transceivers with sending as well as receiving capability. In this case signals originating from the upper control keys (e.g. call taking/rejecting, viewing of messages) and/or image/audio data from the camera/microphone have to be transported from the top housing part 4 to the CPU or main controller of the phone located in the bottom part 2. Another example of a device requiring the bi-directional data link could be a wireless interface like a Bluetooth module or infra-red interface located in the top housing part 4.

A bi-directional connection can e.g. be achieved in a full-duplex manner by adding a second optical link in parallel to the first one, using the same light paths by using different colors or by utilizing a half duplex transmission mode (only one end sends at a time, as e.g. used in IrDA).

Figure 2:
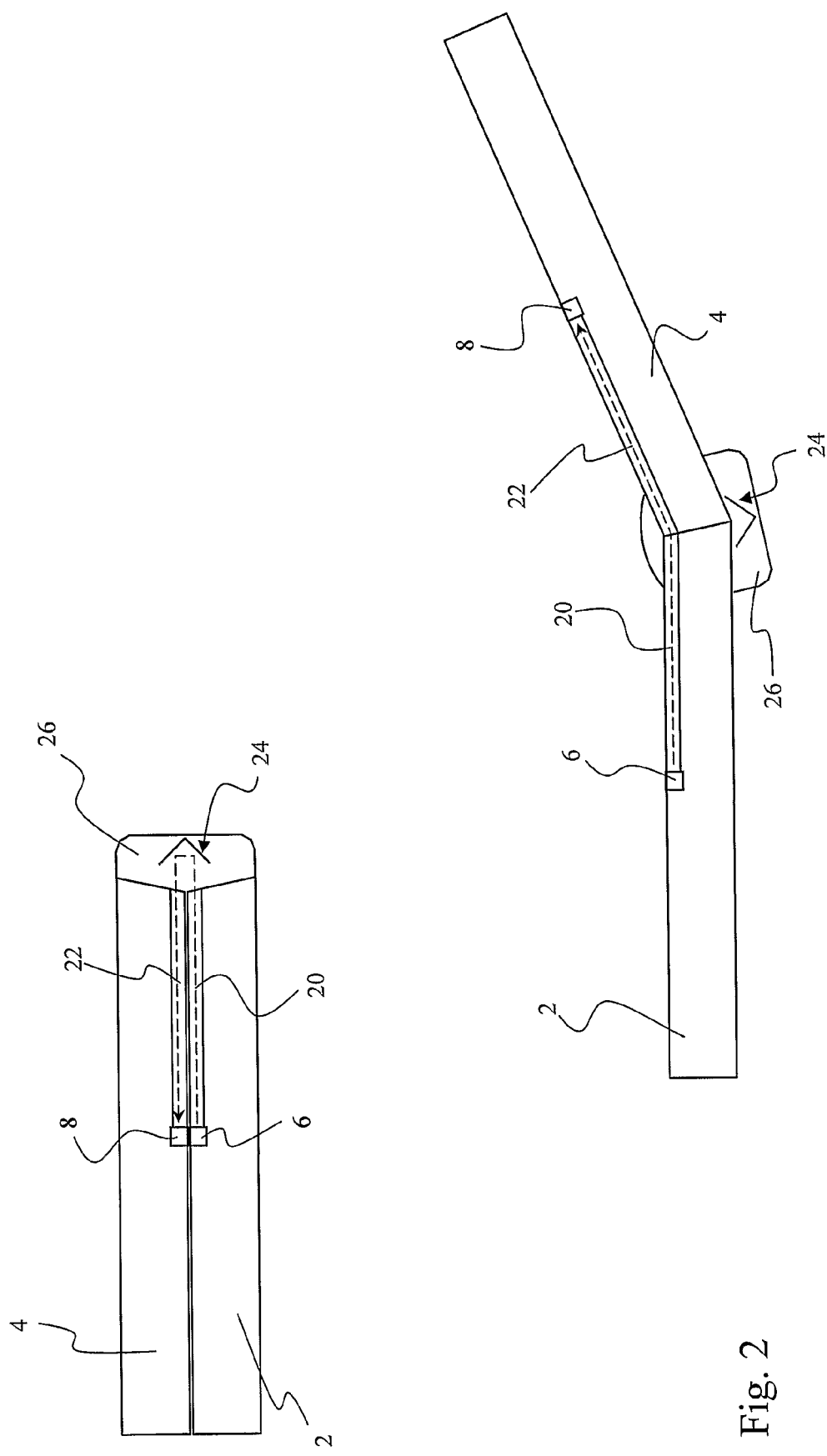
FIG. 2 is a schematic view of an embodiment of the electronic device of the present invention to be used with a foldable phone.

In FIG. 2 a second embodiment of the present invention is depicted, in this case for a so-called flip or foldable phone, comprising a first or bottom housing part 2 and a second or top housing part 4, which are foldably connected via a hinge 26. In the upper left of this figure the phone is shown in its first or closed position, wherein the housing parts 2 and 4 are located on top of each other. In the lower right of this figure the corresponding open position of the flip phone is depicted, where the two housing parts 2 and 4 are folded open, exposing e.g. the keypad and main display etc.

On the bottom part 2 an optoelectronic sender 6 is arranged, which is electrically connected with (not shown) first electronic components accommodated within the bottom part 2. Such electronic components may comprise the bottom connector of the phone, memory devices, the controller or CPU, a keypad and other control keys/means etc. That is, the (electronic interface of) sender 6 is connected with electronic components which require a data connection with other electronic components located in the top housing part 4. A first light guiding element 20 is connected with the optical interface of sender 6.

In this embodiment the second housing part 4 is substantially identical with housing part 2, in a reversed manner. That is, it comprises an optoelectronic receiver 8 having its electronic interface connected with electronic components located within the housing part 4, and having its optical interface connected with a second light guiding element 22.

In the hinge element 26 connecting the two housing parts 2 and 4 a light deflection element 24 is located. The light deflection element 24 is arranged to deflect light emitted from the sender 6 and transported through the light guiding element 20 such that the light enters the light guiding element 22 for being received by receiver 8. That is, in this first position of the two housing parts 2 and 4 a first light duct is formed by the first light guiding element 20, the light deflection element 24 and the second light guiding element 22, providing a first light path (indicated by the dashed arrow) leading light emitted from the sender 6 to the receiver 8.

In the second (closed) position a direct coupling is established between the first and the second light guiding element 20, 22, wherein the light deflection element 24 is completely bypassed. That is, in this second position of the two housing parts 2 and 4 a second light duct is formed by the first light guiding element 20 and the second light guiding element 22, providing a second light path (indicated by the dashed arrow) leading light emitted from the sender 6 to the receiver 8.

As can be seen in this figure, usually foldable phones are arranged such that in the open position the two housing parts 2, 4 are not aligned parallel, but with a certain slant, such that light emitted through one of the light guiding elements will enter the other light guiding element under a certain angle. This can reduce the light intensity or even prevent that the light will reach the receiver with sufficient intensity at all. To compensate this effect at the light guiding elements boundaries, which may occur also in other configurations, including a straight alignment of the light guiding elements, the end facets of the light guiding elements 20, 22 can therefore be provided with appropriate light deflection means, lenses or the like (not shown). In mobile devices where the housing parts are aligned exactly parallel in the open position this measure might not be required.

Figure 3:
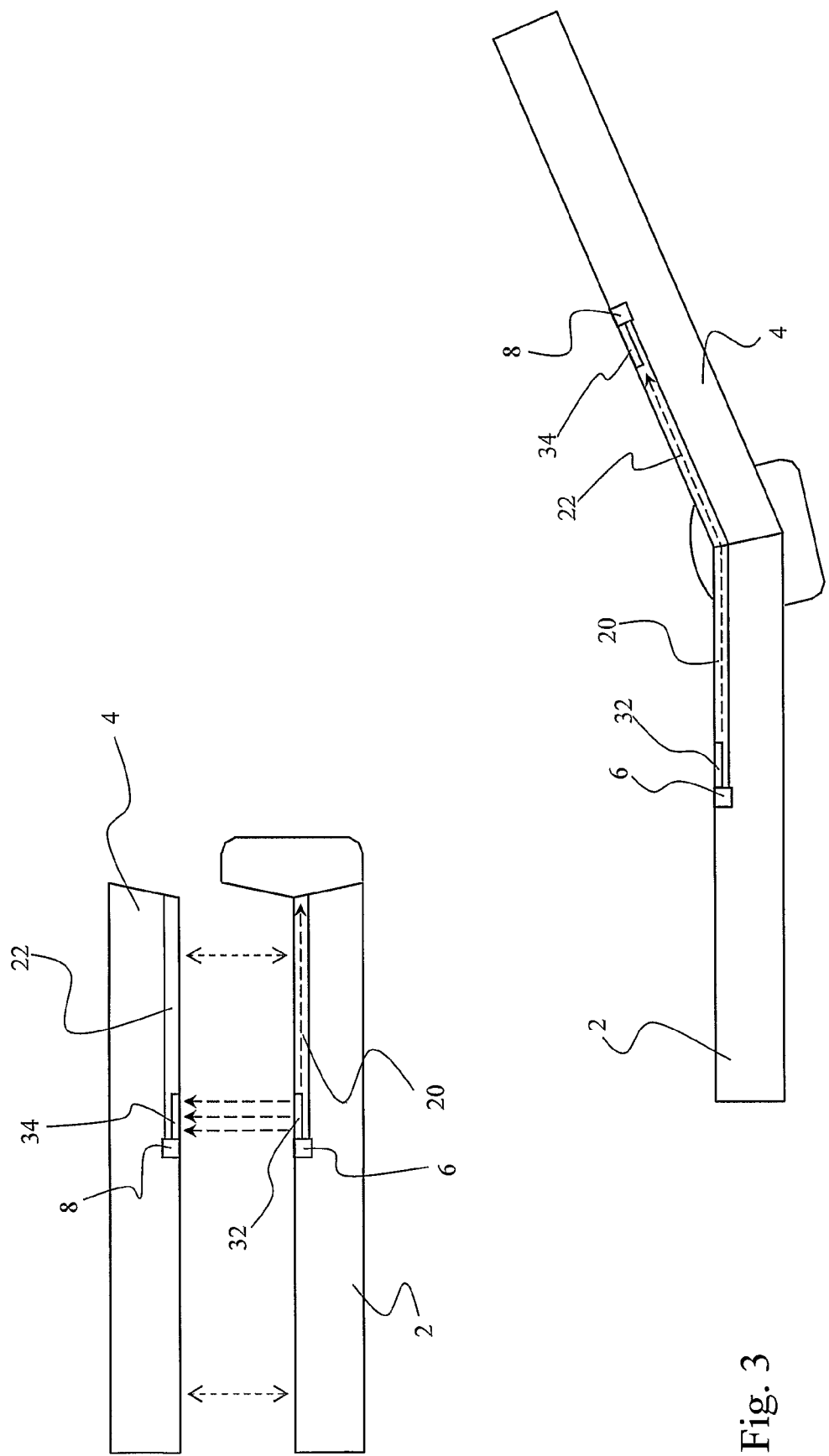
FIG. 3 shows an alternative embodiment of the present invention to be used with a foldable phone.

In FIG. 3 a third embodiment of the present invention is depicted, also for a foldable phone comprising a first or bottom housing part 2 and a second or top housing part 4, which are foldably connected. In the upper left of this figure the phone is shown in its first or closed position, wherein the housing parts 2 and 4 are located on top of each other. In the lower right of this figure the corresponding open position of the flip phone is depicted, where the two housing parts 2 and 4 are folded open, exposing e.g. the keypad and main display etc. In order to improve the intelligibility the top housing part 4 is shown here in a greater distance from the housing part 2 (indicated by the dashed double-arrows) than would be normal. Usually the two housing parts 2, 4 will abut in the closed position.

On the bottom part 2 an optoelectronic sender 6 is arranged, which is electrically connected with (not shown) first electronic components accommodated within the bottom part 2. That is, the (electronic interface of) sender 6 is connected with electronic components which require a data connection with other electronic components located in the top housing part 4. A first light guiding element 20 is connected with the optical interface of sender 6. A first light deflection element 32 is located within the first light guiding element 20, in close proximity or even directly coupled to the sender 6. This first light deflection element 32 can be a kind of beam splitter; possible implementations will be detailed in conjunction with FIG. 4. The first light deflection element 32 is provided to lead light emitted from the sender 6 out of the first light guiding element 20, in this particular embodiment in a direction perpendicular to the extension of the first light guiding element 20.

In this embodiment the second housing part 4 is substantially identical with housing part 2, in a reversed manner. That is, it comprises an optoelectronic receiver 8 having its electronic interface connected with electronic components located within the housing part 4, and having its optical interface connected with a second light guiding element 22. A second light deflection element 34 is located within the second light guiding element 22, in close proximity or even directly coupled to the receiver 8. The second light deflection element 34 is provided to lead light received from the first light deflection element 32 into the second light guiding element 22—in this particular embodiment in a direction perpendicular to the reception direction—to be received by the receiver 8.

That is, in this first position of the two housing parts 2 and 4 a first light duct is formed by the first light deflection element 32 and the second light deflection element 34, providing a first light path (indicated by the dashed arrows) leading light emitted from the sender 6 to the receiver 8. In case the sender 6 and receiver 8 are infra-red optoelectronic devices infra-red transparent windows can be provided on the respective surfaces of the bottom and top housing parts 2, 4, in order to allow a transmission of the (infra-red) light. Infra-red light (IR) may be used due to the reason that the user should not be disturbed by any visible light being emitted from the open phone. However, in principle also visible light may be used instead. For example this could be used as a design or fun feature, in a similar manner as the small LED flash stickers blinking responsively to the electromagnetic radiation emitted from a mobile phone antenna.

In this case it may be advantageous to provide the transceiver 6 with some standard infra-red interface protocol like IrDA and the like, at least to be supported in the open position. As the transceiver 6 is only visible from the outside in the open position, and light will always be emitted out from the first light deflection element 32 anyway, it can thus provide a useful wireless data link for synchronizing data between the mobile phone and a PC, PDA or the like.

In the second (open) position a direct coupling is established between the first and the second light guiding element 20, 22 substantially similar to the situation already described in conjunction with FIG. 2. That is, in this second position of the two housing parts 2 and 4 a second light duct is formed by the first light guiding element 20 and the second light guiding element 22, providing a second light path (indicated by the dashed arrow) leading light emitted from the sender 6 to the receiver 8. Also in this embodiment measures have to be taken for compensating any angle between the housing parts in the open position. In order to avoid repetitions please refer to the corresponding description of FIG. 2.

Compared to the embodiment of FIG. 2 there are two differences. Due to the fact that the light deflection element 32 (and 34, in case the receiver 8 is a transceiver) will always couple out a certain amount of light intensity, the light intensity within the light guiding elements 20, 22 is reduced. This requires the power of the optical sender (transceiver) to be adapted, i.e. increased sufficiently, in order to ensure a reliable data connection. On the other hand this embodiment entails the advantage that it is independent from the actual hinge construction, as the light deflection does not occur within the hinge. Depending on the way the two housing parts are connected this can help to improve the design flexibility. Also, as mentioned above, it enables to use (one of) the transceiver(s) also as an optical data interface for synchronizing purposes with other devices or like.

Figure 4:
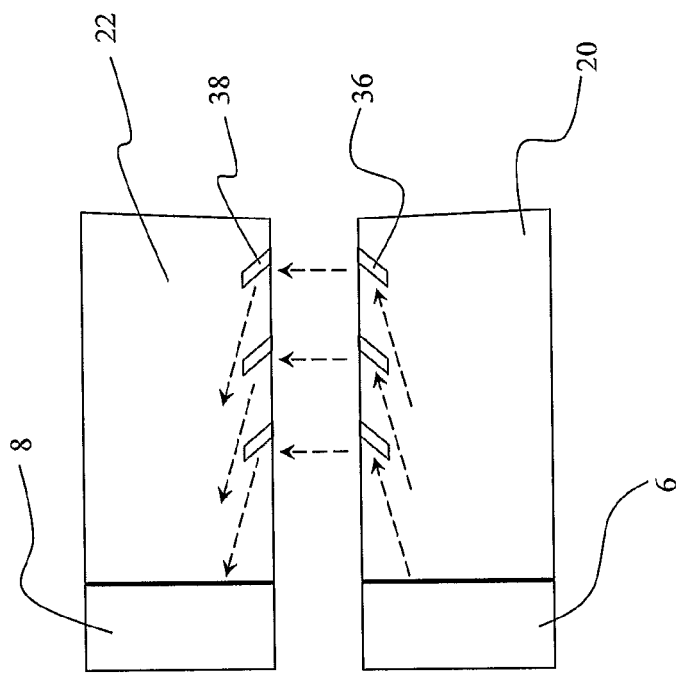
FIG. 4 shows two alternative implementations of light deflection devices as used in embodiments of FIGS. 2 and 3.
Figure 4:
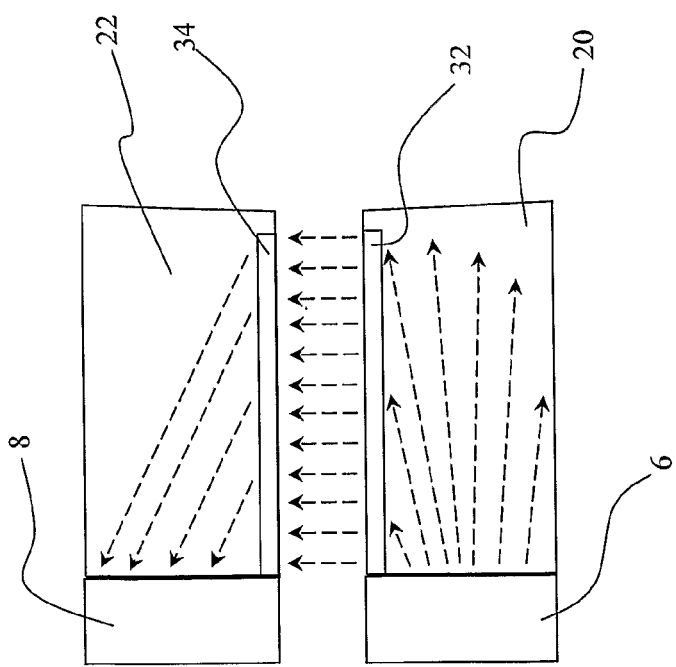

In FIG. 4 two possible implementations of the light deflection devices are depicted, as they may be used in embodiments as described in conjunction with FIG. 3. In the upper left of this figure a first embodiment is illustrated, wherein optical diffraction gratings 32 and 34, respectively, are used to couple out a certain fraction of the light intensity emitted by the optoelectronic sender 6. It should be noted that the gratings are only shown schematically here.

A diffraction grating is a reflecting or transparent substrate whose surface contains fine parallel grooves or rulings that are equally spaced. When light is incident on a diffraction grating, diffractive and mutual interference effects occur, and light is reflected or transmitted in discrete directions, called orders. Therefore such diffraction gratings can be used to deflect light in a discrete direction, as required by this embodiment of the invention. The fine grooves can easily be formed in the light guiding elements, e.g. in the very common plastic light guides. Also it is possible to specifically design the actual deflection, inter alia with respect to the deflection direction, more flexible than with the use of mirrors or like optical devices.

As shown in the left upper section of this figure, light is emitted by the sender 6. A fraction of the light will be incident on the diffraction grating 32 and be deflected to couple into the corresponding grating 34. In the grating 34 the incident light is in turn deflected to be received by the receiver 8. Due to the nature of optics this process and thus the optical path can be reversed, which relates to the case where sender 6 and receiver 8 are optoelectronic transceivers having both sending and receiving capabilities. The actual fraction of light intensity coupled out of the light guiding element 20 will be dependent on the overall design of the electronic device where the arrangement is used.

That is, it has to be ensured that in both positions of the housing parts the optical link can reliably be established. This is closely tied to the intensity arriving at the receiver 8. A certain damping will occur in both light paths, due to the properties of the involved gratings and the material of the light guiding elements. It is possible to design the optical paths such that substantially equal intensities arrive at the receiver 8 in both configurations. This would help to design the reception properties of the receiver more easily, as the receiver will encounter identical conditions in both configurations.

However, it may also be advantageous to design the arrangement such that a higher intensity arrives at the receiver in the open position of the mobile electronic device in question. It is far more likely that the required data transfer capacity will be considerably higher in the open position, where keypad and display are exposed and the phone is fully usable. In contrast, in the closed position it is far more likely that only a substantially reduced amount of data has to be transferred (e.g. when the camera in the phone is only usable in the open configuration or the main display is only activated in the open position). It can therefore be advantageous to have the gratings couple out only a small fraction of the light intensity, compared to the fraction being emitted into the light guiding element, to deal with different data rate requirements.

In the lower right of FIG. 4 another implementation of the light deflection device is shown. Here small cuts 36 and 38 are formed in the light guiding element, forming small mirror elements through exploitation of the total reflection occurring at the interface between the material of the light guiding elements 20, 22 and air. This arrangement is simple and effective, can easily be produced by introducing the cuts into the (e.g. plastic) material of the light guiding elements, and provides a good efficiency with respect to the deflected intensity due to the properties of the total reflection. It is also easy to adapt the deflected light intensity or the intensity of light coupled out, respectively, through the number of those cuts (three in this example).

Figure 5:
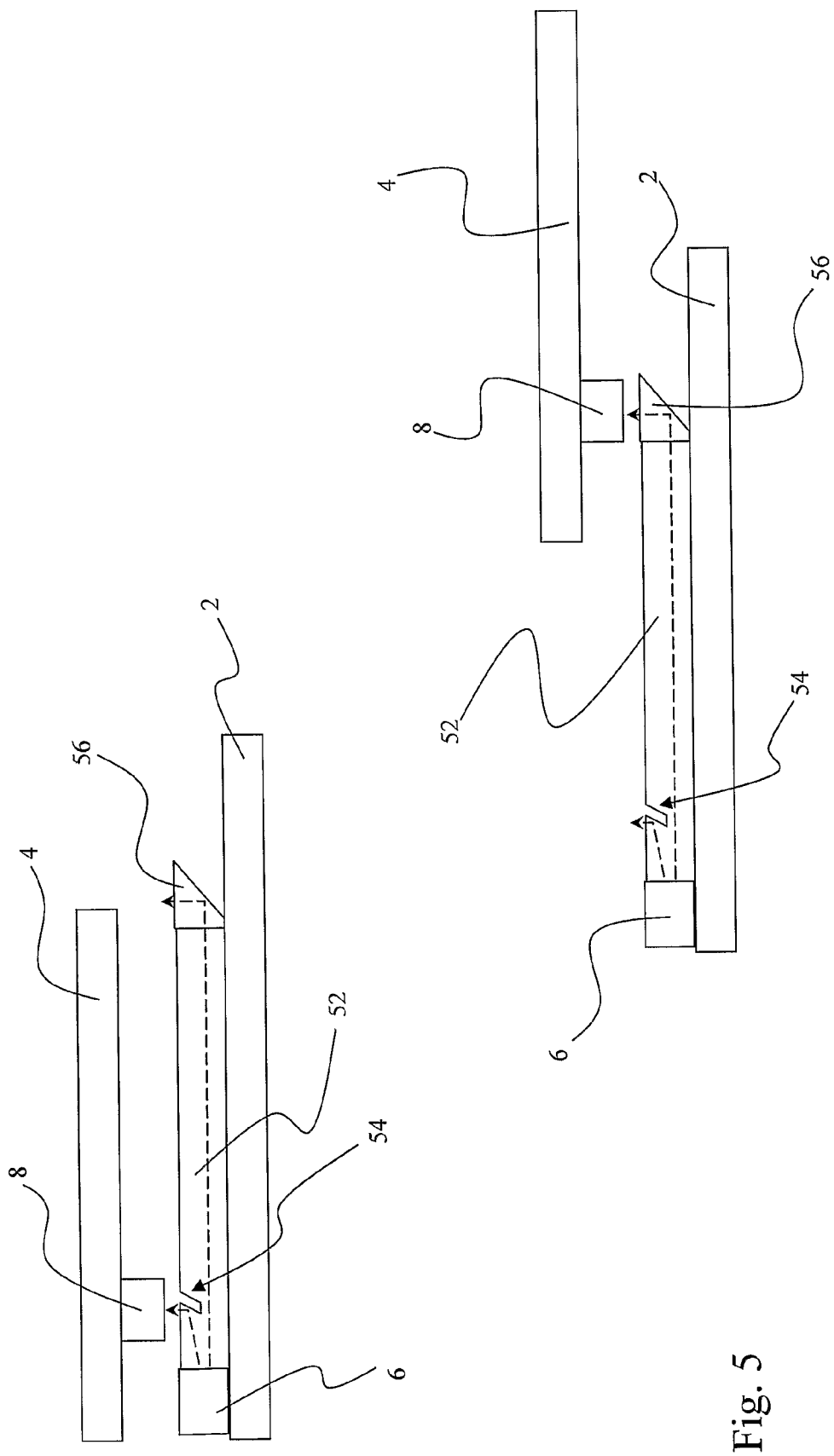
FIG. 5 is a schematic view of another embodiment of the electronic device of the present invention to be used with a slide phone.

In FIG. 5 another embodiment of the present invention is shown. This embodiment also relates to a slider phone comprising a first or bottom housing part 2 and a second or top housing part 4. In the upper left of this figure the phone is shown in its first or closed position, wherein the housing parts 2 and 4 are located on top of each other. In the lower right of this figure the corresponding open position of the slider phone is depicted.

On the bottom part 2 an optoelectronic sender 6 is arranged, which is electrically connected with (not shown) first electronic components accommodated within the bottom part 2. That is, the (electronic interface of) sender 6 is connected with electronic components which require a data connection with other electronic components located in the top housing part 4. On the second or top housing part 4 an optoelectronic receiver 8 is located. A light guiding element 52 is connected with the optical interface of sender 6. This light guiding element 52 comprises a first light deflection element 54, shown here as a cut into the light guiding element, which stands exemplarily for any beam splitter element that may instead be used. For example also an optical diffraction grating as in previous embodiments may be used.

Similarly to the embodiments described in conjunction with FIGS. 3 and 4 the light emitted by the sender 6 is thus split up here. A fraction of the light intensity is deflected by the first light deflection element 54, to be received—in the first position of the two housing parts 2, 4—by the receiver 8. In this first position the housing parts 2 and 4 are located such that the first light deflection element 54 forms a first light duct providing a first light path (indicated by the upper dashed arrow), which leads light emitted from the sender 6 to the receiver 8.

At the end opposite the sender 6 a second light deflection element 56 is located. It should be noted that this element 56 can be a separate element joined with the light guiding element 52 as shown here, while in other embodiments the light guiding element 52 itself may be designed (e.g. appropriately cut/coated etc.) to provide this light deflection element 56 as integral part thereof. In contrast to the first light deflecting element 54 the light deflection element 56 is arranged for deflecting the total remaining light intensity transported within the light guiding element 52 not coupled out by the first light deflection element 54. For example a simple mirror or like element can be used for that purpose. In the second position of the two housing parts 2, 4 a second light duct is formed by the light guiding element 52 and the light deflection element 56, providing a second light path (indicated by the long dashed arrow) which again leads light emitted from the sender 6 to the receiver 8.

The principle of the arrangement shown in this figure is similar to the embodiments described in conjunction with FIGS. 3 and 4; therefore the same considerations with respect to light intensity apply here as well. In this embodiment it is also possible to provide the sender 6 as a transceiver acting as a wireless interface for synchronizing data on the mobile device with a PC, PDA or like. In order to avoid repetitions please refer to the description of FIGS. 2-4 with respect to this aspect.

Figure 6:
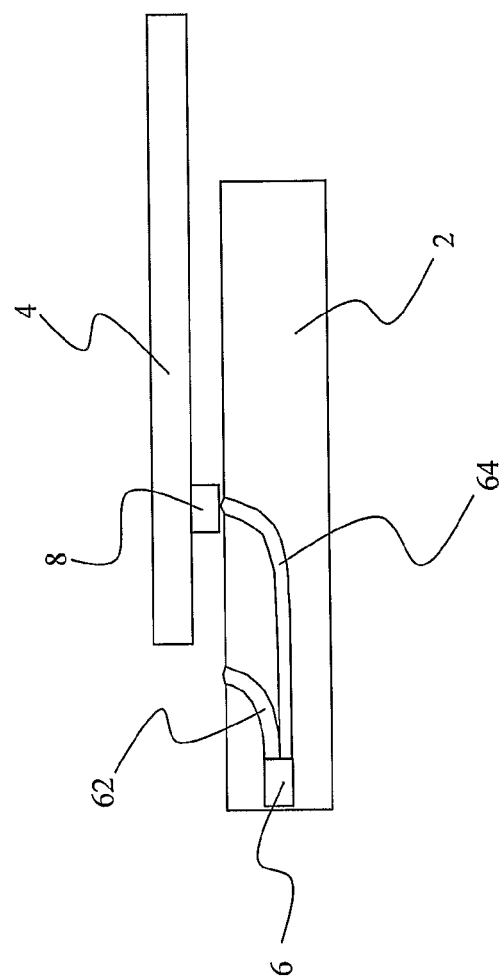
FIG. 6 is schematic view of yet another embodiment of the electronic device of the present invention to be used with a slide phone.
Figure 6:
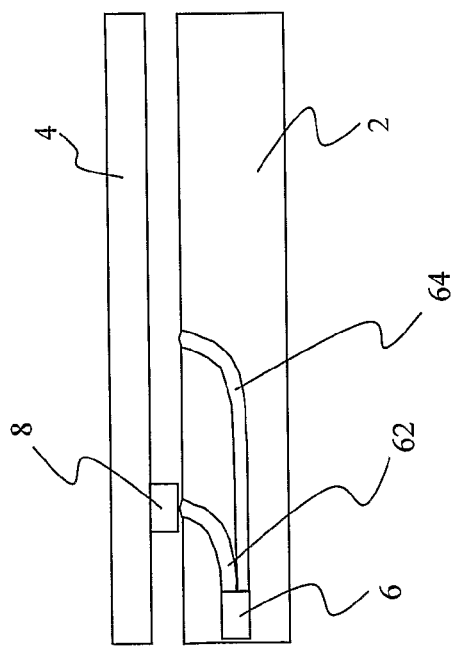

FIG. 6 depicts another variant of a "beam splitter" type arrangement. Therefore many of the considerations made above apply here as well, so please also refer to the detailed description of the corresponding previously described embodiments. In this particular embodiment, which also relates to a slider type phone, glass or plastic fibres are used as light ducts. It should be noted that the term "glass/plastic fibre" in the context of the present invention is used as a synonym for either a single fibre or a combined bundle of several fibres. In this specific embodiment shown here a first glass fibre 62 extends from the sender 6 to a point in the housing part 2 which is—in the closed position of the slider phone shown in the upper left section of this figure—located such that light emitted from sender 6 is led to be received by receiver 8 in the top housing part 4.

In the lower right section of the figure the open position of the mobile device is shown. A second glass fibre 64 is also connected with the optical interface of sender 6. Basically it will depend on the actual area of the optoelectronic sender 6 occupied by the connection of the different glass fibres which amounts of light intensity will be coupled into each glass fibre. Similar considerations with respect to the light intensity as with the previous embodiments apply here as well; therefore please refer to the corresponding descriptions with regard to this aspect. The second glass fibre (bundle) 64 extends from sender 6 to a position on the housing part 2 which is—in the open position of the slider phone shown in the lower right section of this figure—located such that light emitted from sender 6 is led to be received by receiver 8 in the top housing part 4.

Glass fibres are easy to use; it is even possible to mould them into the body of the housing part. They show good optical properties and can be arranged very flexible within the respective housing part, therefore this is an advantageous embodiment of the present invention. It may even be possible to embed them prior to or during the actual moulding process for producing the housing part, which can help to simplify and shorten the device production process and reduce product volume.

The present invention can make use of light guides which are usually rigid plastic parts that can be used to lead light in a similar way as known from optical fibres. In light guides the change in the refractive index—required to keep the light inside the guide—is usually constituted by the light guide/air interface. Another possible design of light guides is similar to optical fibres, and here the change in the refractive index is caused by a cladding material around the thick core. Light guides are usually made of polymers.

In the present invention all kinds of optoelectronic devices can be used, for example (infra-red) photo diodes and transistors, and also laser diodes and light emitting diodes together with the respective receiver devices. It should also be noted that all conventional optical devices as lenses, mirrors, prisms, parabolic/elliptic mirrors and the like can be used with the present invention when appropriate. For example, the light deflection device can be constituted by simple mirrors, parabolic mirrors, and prisms.

Lenses for correcting/improving the light path(s) can also be used, e.g. at the entrance or exit of light guiding elements, or connected directly with the optoelectronic sender/receiver/transceiver, e.g. for providing a substantially linear or non-divergent exit/entry path of light exiting/entering the respective devices. In contrast, certain embodiments rely on an at least slightly divergent exit/entry of light, particularly embodiments using the "beam splitter" approach with diffraction gratings. Therefore suitable lenses and also other conventional optical devices can be used to obtain the desired/required light path. Just as an example, the parabolic/elliptic mirror used in the embodiment of FIG. 1 can be exchanged by a prism.

In case of a use of an elliptical mirror it is required that the ends of the first and second light guides have to be located in the conjugated points of the elliptical mirror. All light will be transferred and the numerical aperture is kept. Using a prism approach is possible when a non-divergent light beam is created, e.g. by providing a suitable lens on the first light guide input facet, or using laser light.

The light guides to be used with the invention can be implemented in several manners, e.g. as pure polymer pipe, as polymer pipe with cladding ("fibre type") or as fibre bundle made of plastic or glass fibres. Especially the latter offers the possibility to embed the light guide into the phone cover mould, thus not requiring extra space and providing an improved protection.

The inventive idea might also be used also for sensor purposes, e.g. to detect the slider position optically. For example the mobile device can detect the amount of light reaching the photo diode in one of the positions, e.g. the cases as shown in FIGS. 3, 4 and 5. In these cases only a small amount of light reaches the optical receiver in the closed position of the phone, and thus only slow data transmission is possible. In this manner it can be determined if the phone is in the open or closed position. The mobile device of the invention may be designed such that the (optical) data connection is only possible in two discrete positions, that is, open or closed.

The present invention provides an electronic device wherein the data connection between two movable housing parts does not comprise any mechanically stressed parts like the conventional flexible cables. For the required power connection conventional cables can be used, which are reliable for this purpose, or an arrangement with sliding contacts (in the case of slider phones), e.g. as part of the sliding/folding mechanism, can be used. Also inductive or capacitive coupling may be used. The invention furthermore enables high-speed data transfer in conjunction with small space requirements. In addition the optical media or light guiding elements/light ducts, respectively, is not susceptible to any electromagnetic interference (EMI), although the receiver device itself may still be susceptible thereto and require appropriate shielding. In certain embodiments the optical data transfer arrangement can even be embedded into the phone cover or other moulds, for improved protection thereof. As the actual connection between the housing parts is an air interface without a physical connection instead of a wired connection, the invention may even make the production of corresponding devices more flexible, as the different housing parts do not need to be joined or brought in close proximity preliminarily for attaching the conventional cables for the data connection.

It should be apparent that the present invention can also be applied to electronic devices with more than two housing parts which are movable. For example it can be applied to a foldable phone having two main housing parts and a camera module that can be turned 180° for capturing self-portraits of the user of the device. Also the invention is not to be limited to mobile phones only. It can be used in any electronic device comprising two or more housing parts which are movable in relation to each other, and wherein a data connection between the housing parts is required.

The invention claimed is:

1. Electronic device, comprising:
   a first housing part comprising first electronic components;
   a second housing part comprising second electronic components;
   wherein said first housing part and said second housing part are slidably connected and capable of taking at least a first and a second position in relation to each other;
   a first optoelectronic device connected with said first electronic components;
   a second optoelectronic device connected with said second electronic components;
   a first light guiding element connected with said first optoelectronic device;
   a second light guiding element connected with said second optoelectronic device; and
   a light deflection element arranged on said second housing part,
   wherein
   a first light duct is formed by said first light guiding element; and
   a second light duct is formed by said first light guiding element, said light deflection element and said second light guiding element;
   and wherein
   said first light duct is configured to provide a first light path optically coupling said optoelectronic devices in said first position; and
   said second light duct is configured to provide a second light path optically coupling said optoelectronic devices in said second position.

2. Device according to claim 1, wherein said first optoelectronic device is an optical emitter and said second optoelectronic device is an optical receiver.

3. Device according to claim 1, wherein said first and second optoelectronic devices are optical transceivers.

* * * * *